United States Patent [19]

Hsiao

[11] Patent Number: 5,193,283
[45] Date of Patent: Mar. 16, 1993

[54] BICYCLE WHEEL SPOKE INSPECTING AND ADJUSTING DEVICE

[76] Inventor: Alex Hsiao, 4, Lane 11, Tze Chiang St., Tu Cheng Shiang, Taipei Shien, Taiwan

[21] Appl. No.: 919,254

[22] Filed: Jul. 27, 1992

[51] Int. Cl.⁵ .......................... G01B 5/255; G01B 5/28
[52] U.S. Cl. ................................... 33/203.19; 33/203
[58] Field of Search ............... 33/203, 203.16, 203.19, 33/203.18, 203.2

[56] References Cited

U.S. PATENT DOCUMENTS

| | | | |
|---|---|---|---|
| 253,823 | 2/1882 | Myers | 33/203.19 |
| 536,377 | 3/1895 | Dudly | 33/203.16 |
| 621,153 | 3/1899 | Schmidt | 33/203.19 |
| 747,603 | 12/1903 | Gkaber | 33/203.19 |
| 1,240,528 | 9/1917 | Alsworth | 33/203.19 |
| 4,126,942 | 11/1978 | Damman | 33/203.16 |
| 4,143,464 | 3/1979 | Lahos | 33/203.16 |

FOREIGN PATENT DOCUMENTS

| | | | |
|---|---|---|---|
| 76164 | 7/1953 | Denmark | 33/203.16 |
| 448592 | 5/1949 | Italy | 33/203.19 |
| 263978 | 1/1927 | United Kingdom | 33/203.16 |

*Primary Examiner*—Thomas B. Will
*Attorney, Agent, or Firm*—Bacon & Thomas

[57] ABSTRACT

A bicycle wheel spoke inspecting and adjusting device for inspecting the roundness of the rim of a bicycle wheel and adjusting the spokes of the bicycle wheel. The device includes two pivoted plates controlled by a torsional spring for securing a detecting bolt to the brake on a bicycle wheel permitting the probe on the front end of the detecting bolt to contact the rim of the bicycle wheel for inspecting the roundness, a spanner detachably hung on the detecting bolt and used for turning the spoke tightening knob of the spoke to be adjusted.

1 Claim, 5 Drawing Sheets

BICYCLE WHEEL SPIKE INPECTING AND ADJUSTING DEVICE

BACKGROUND OF THE INVENTION

The present invention relates to a bicycle wheel spoke inspecting and adjusting device for inspecting the roundness of the rim of a bicycle wheel and adjusting the spokes of the bicycle wheel.

For smooth rotating, the rim of the wheels of a bicycle must be maintained in good roundness. The roundness of the rim of a bicycle wheel is supported by the spokes (see FIG. 1). However, the spokes may be caused to deform easily, more particularly under a heavy load or after long uses. If a spoke is deformed it must be stretched straight by a bicycle wheel spoke adjusting device or replaced with a new one. FIG. 2 illustrates a bicycle wheel spoke adjusting device according to the prior art. This device is simply designed for adjusting the spokes of a bicycle wheel but not workable for inspecting the roundness of the rim. Conventionally, inspecting the roundness of the rim is made through a visual inspection to see the gap between the rim and the blade of the bicycle brake. This inspecting method can not precisely examine the actual degree of deformation of the rim. Although there are inspecting instruments for inspecting the roundness of the rim, these instruments are commonly expensive and require much space for storage.

SUMMARY OF THE INVENTION

The present invention has been accomplished under the aforesaid circumstances. It is therefore an object of the present invention to provide a bicycle wheel spoke inspecting and adjusting device which has means for inspecting the roundness of the rim of a bicycle wheel and means for adjusting the spokes of a bicycle wheel. Another object of the present invention is to provide a bicycle wheel spoke inspecting and adjusting device which is compact and has means for fastening to the bicycle brake for inspecting the roundness of the rim. Still another object of the present invention is to provide a bicycle wheel spoke inspecting and adjusting device which is inexpensive to manufacture.

DETAILED DESCRIPTION OF THE PREFERRED EMBODIMENT

Figure 1:
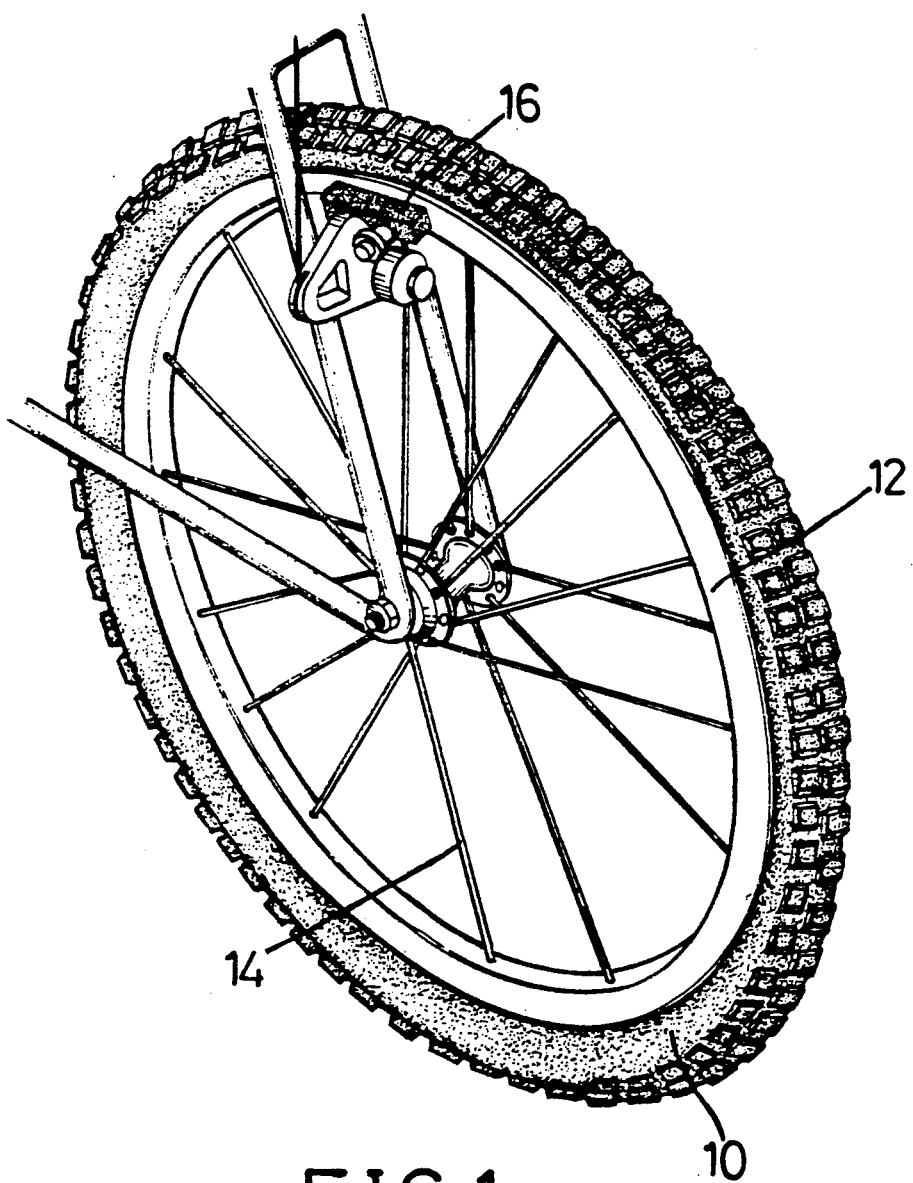
FIG. 1 illustrates the structure of a bicycle wheel on bicycle's frame.
Figure 2:
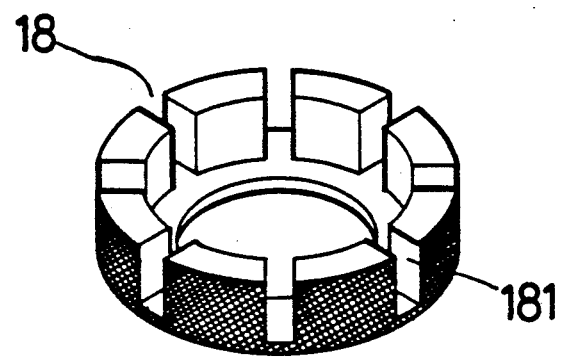
FIG. 2 is an elevational view of a bicycle wheel spoke adjusting device according to the prior art.
Figure 4:
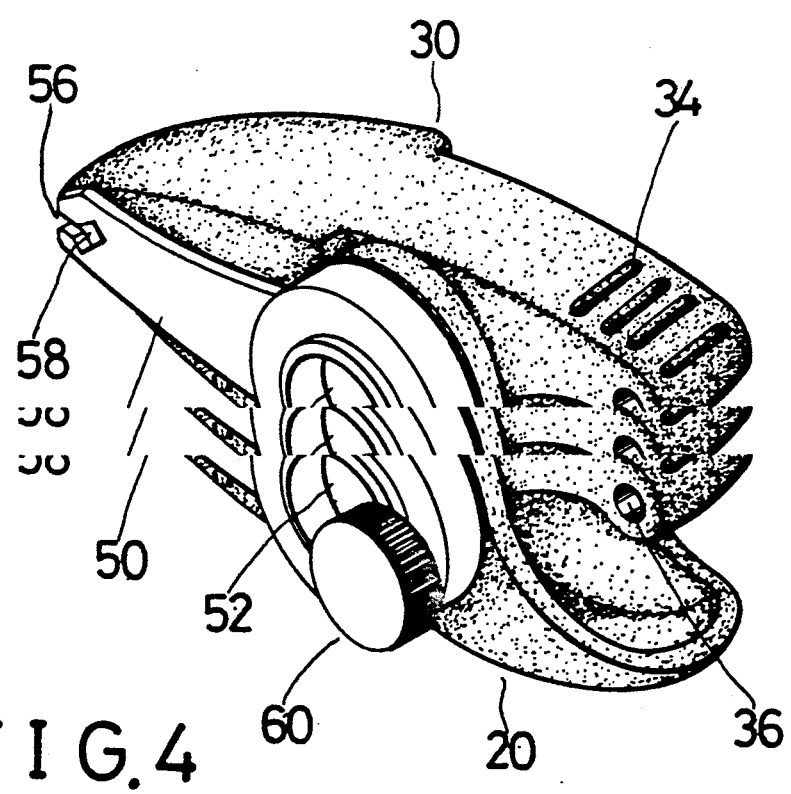
FIG. 4 is an elevational view of the bicycle wheel spoke inspecting and adjusting device of FIG. 3.
Figure 3:
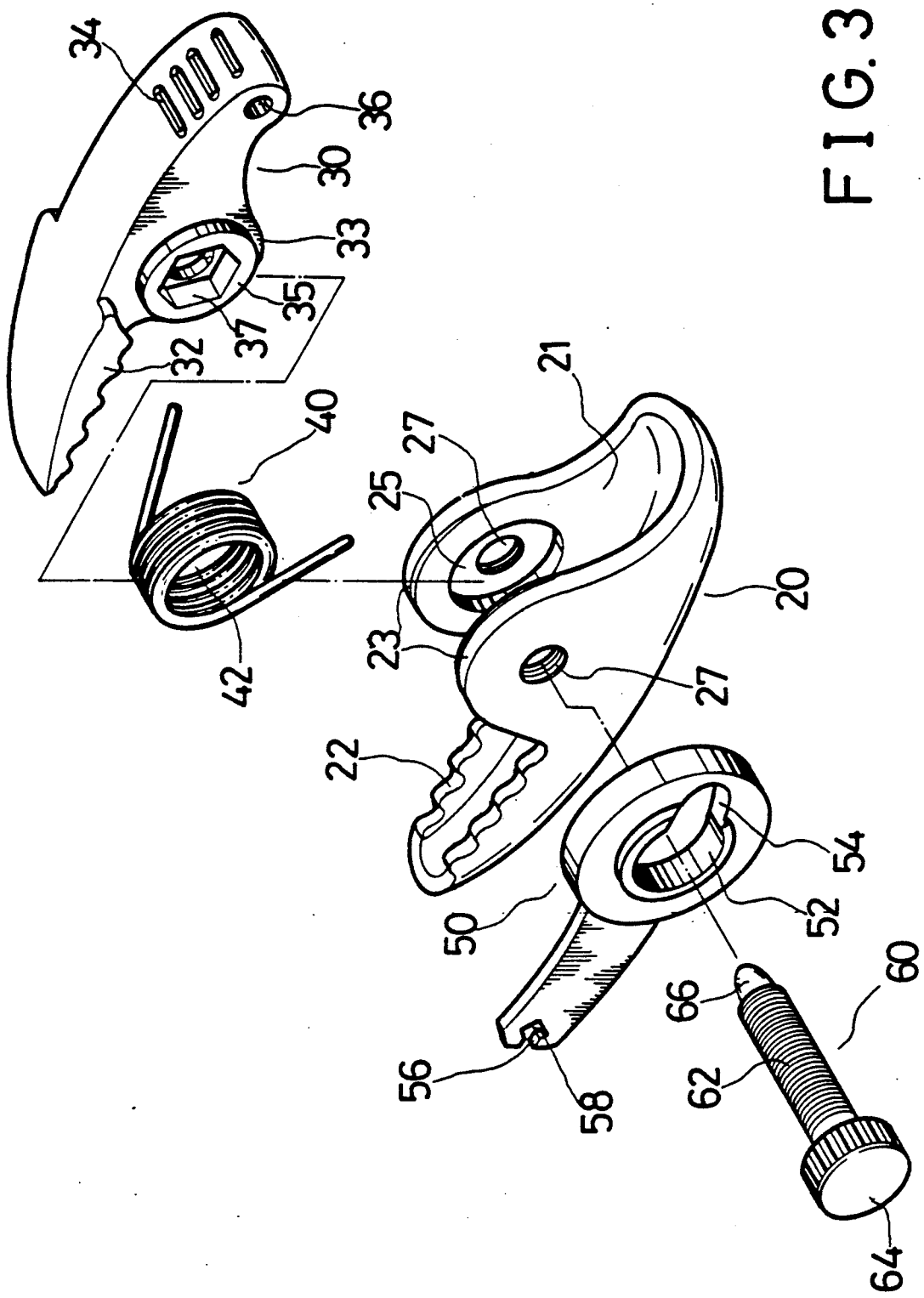
FIG. 3 is an exploded view of a bicycle wheel spoke inspecting and adjusting device according to the present invention.

Referring to FIGS. 3 and 4, a bicycle wheel spoke inspecting and adjusting device as constructed in accordance with the present invention is generally comprised of a base plate 20, a clamping plate 30, a torsional spring 40, a spanner 50, and a detecting bolt 60. The base plate 20 is made from an arched channel plate having two parallel side walls formed into a toothed jaw 22 on one end and two parallel lugs 23 on an opposite end, with a receiving channel 21 defined therebetween. The two parallel lugs 23 have each a recessed hole 25 on the respective inside surface and a bolt hole 27 through the center of the recessed hole 25. The clamping plate 30 is also made from a substantially arched channel plate having two parallel side walls formed into a toothed jaw 32 on one end and two parallel lugs 33 on an opposite end, with a receiving channel (not shown) defined therebetween. The two parallel lugs 33 have each a circular block 35 raised on the respective outside surface and a polygonal hole 37 through the circular block 35. The spanner 50 has an axle hole 52 and an elongated locating hole 54 communicated on one end, a square hole 58 on an opposite end extended to the outside through an opening 56. The detecting bolt 60 has a head 64 on end end, a probe 66 on an opposite end, and an outer thread 62 on the middle, wherein the outer diameter of the head 64 is smaller than the inner diameter of the axle hole 52 but bigger than the pitch of the elongated locating hole 54. The assembly process of the bicycle wheel spoke inspecting and adjusting device is easy. Inserted the clamping plate 30 into the receiving channel 21 of the base plate 20 permitting each circular block 35 to be engaged into the respective recessed hole 25 on the base plate 20, and therefore the clamping plate 30 and the base plate 20 become pivoted to each other. The torsional spring 40 is then inserted into the receiving channels 21,31 between the two parallel lugs 33 with the center hole 42 thereon aligned with the bolt holes 27 on the two parallel lugs 23 of the base plate 20, the polygonal holes 37 on the two parallel lugs 35 of the clamping plate 30. The detecting bolt 60 is then threaded into the bolt holes 27 on the base plate 20 to connect the spanner 50, the torsional spring 40 and the base plate 20 together. When connected, the spanner 50 is hung on the detecting bolt 60 permitting the outer thread 60 of the detecting bolt 60 to be positioned in the elongated locating hole 54. Because the axle hole 52 on the spanner 50 is bigger than the head 64 of the detecting bolt 60, the spanner 50 can be conveniently hung on the outer thread 62 of the detecting bolt 60, and then secured in place by the detecting bolt 60.

Figure 5:
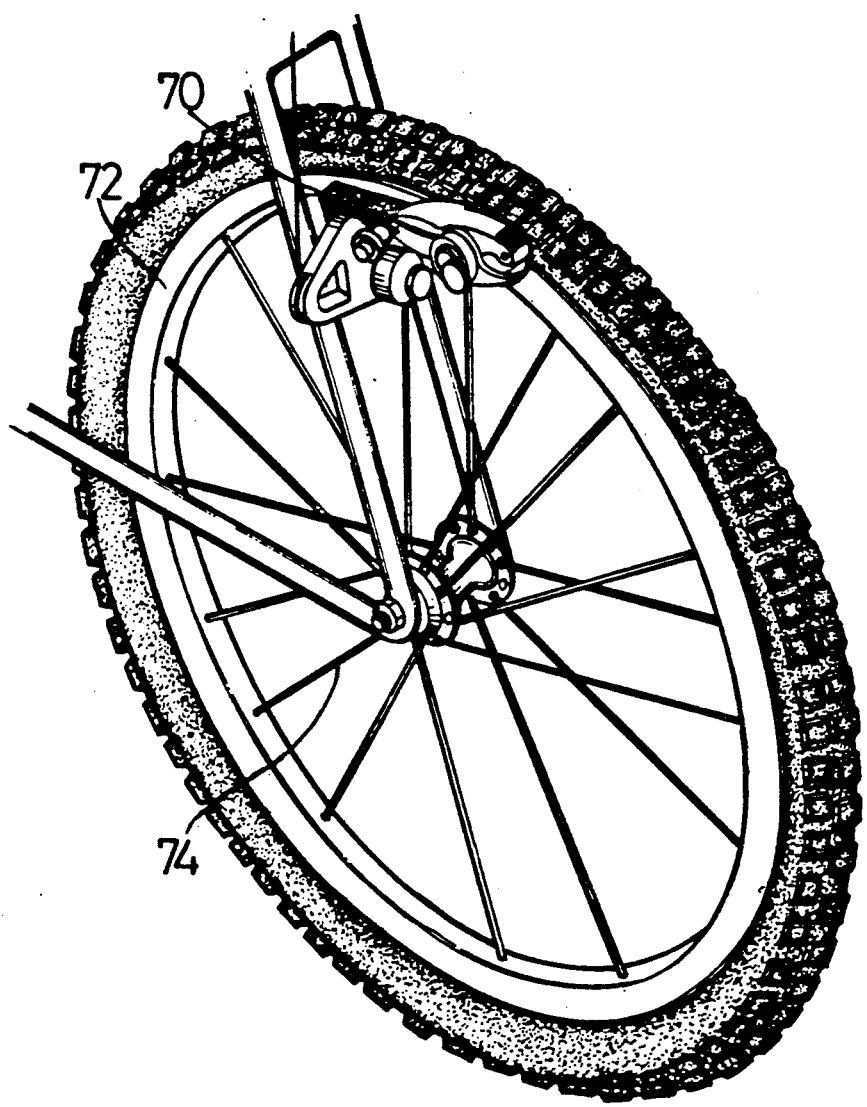
FIG. 5 is an installed view according to the present invention showing that the bicycle wheel spoke inspecting and adjusting device of FIG. 3 has been fastened to the bicycle brake.
Figure 6:
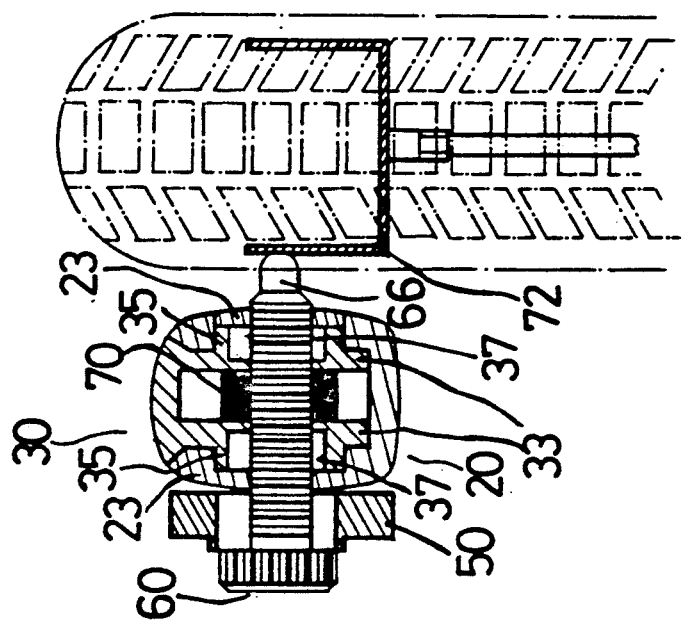
FIG. 6 is a sectional view showing that the probe of the detecing bolt is made in contact with the rim for insepcting the roundness of the rim.

Referring to FIGS. 5 and 6, the bicycle wheel spoke inspecting and adjusting device is clamped on the bicycle brake 70 of a bicycle wheel by means of the toothed jaws 22,32 with the probe 66 of the detecting bolt 60 slightly made in contact with the rim 72. Then, rotating the bicycle wheel to see the change in gap between the probe 66 and the rim 72. Therefore, any deformation of the rim 72 can be quickly inspected.

Figure 8:
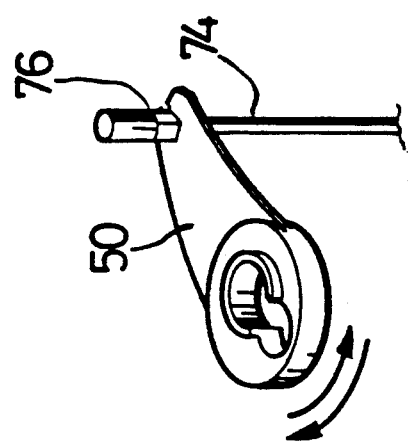
FIG. 8 illustrates the operation in turning the spoke tightening knob with the spanner.
Figure 7:
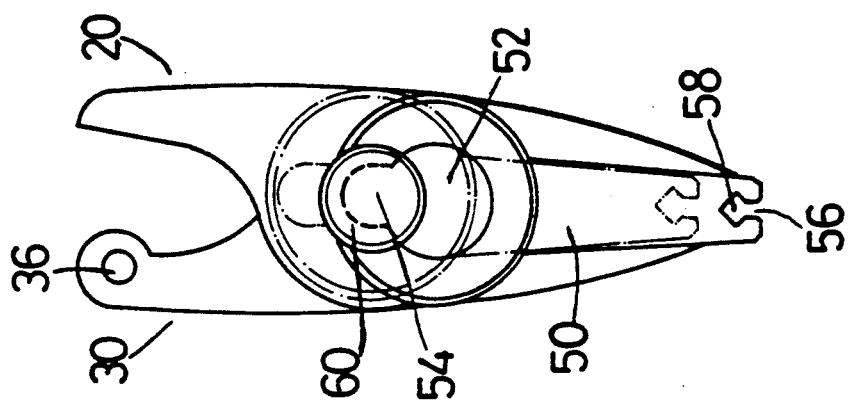
FIG. 7 illustrates the operation in removing the spanner from the detecting bolt.

Referring to FIGS. 7 and 8, if the rim 72 is checked deformed, the spanner 50 is removed from the detecting bolt 60 for adjusting the spoke or spokes of the deformed area. The spanner 50 can be conveniently removed from the detecting bolt 60 by moving it rightwards relative to the detecting bolt 60 to release the detecting bolt 60 from the elongated locating hole 54

(see FIG. 7). After removed from the detecting bolt 60, the spanner 50 is mounted on the spoke tightening knob 76 of the spoke 74 to be adjusted by inserting the spoke tightening knob 76 through the opening 56 into the square hole 58, and then spoke tightening knob 76 is rotated by the spanner 50 to stretch the spoke 74 properly.

Referring to FIG. 3 again, the clamping plate 30 has raised strips 34 on the outside surface for positive gripping, and a through hole 36 for hanging when not in use.

What is claimed is:

1. A bicycle wheel spoke inspecting and adjusting device comprising:
    a base plate having a receiving channel defined within two parallel side walls, the parallel side walls of said base plate being formed into a toothed jaw on one end and two parallel lugs on an opposite end, the two parallel lugs of said base plate having each a recessed hole on the inside and a bolt hole through the recessed hole;
    a clamping plate having a receiving channel defined within two parallel side walls, the parallel side walls of said clamping plate being formed into a toothed jaw on one end and two parallel lugs on an opposite end, the two parallel lugs of said clamping plate having each a circular block raised on the outside engaged into the recessed hole on either lug of said base plate and a polygonal through hole through the circular block;
    a torsional spring received in the receiving channel of said clamping plate and the receiving channel of said base plate and retained between the two parallel lugs of said clamping plate, said torsional spring having one end stopped against said base plate and an opposite end stopped against said clamping plate and a center hole aligned with the bolt hole on each lug of said base plate and the polygonal hole on each lug of said clamping plate;
    a detecting bolt threaded into the bolt hole on each lug of said base plate and inserted through the center hole of said torsional spring and the polygonal through hole on each lug of said clamping plate to connect said base plate, said torsional spring and said clamping plate together, said detecting bolt having a head on one end, a probe on an opposite end, and an outer thread between the probe and the head;
    a spanner removably hung on the outer thread of said detecting bolt for adjusting the spokes of a bicycle wheel, said spanner having an axle hole and an elongated locating hole communicated on one end for hanging on the outer thread of said bolt, a square hole on an opposite end extended to the outside through an opening for turning the spoke tightening knob of a bicycle wheel spoke; and
    wherein the bicycle wheel spoke inspecting and adjusting device is clamped on the brake on a bicycle wheel with the probe of said detecting bolt slightly made in contact with the rim of the bicycle wheel for inspecting the roundness of the rim; said spanner is removed from said detecting bolt for turning the spoke tightening knob of the spoke to be adjusted.

* * * * *